(12) United States Patent
Jördens et al.

(10) Patent No.: US 10,698,116 B2
(45) Date of Patent: Jun. 30, 2020

(54) METHOD FOR DETERMINING A DESIRED TRAJECTORY FOR A FIRST TRAFFIC USER, IN PARTICULAR FOR A MOTOR VEHICLE, FOR A ROUTE SECTION

(71) Applicant: VOLKSWAGEN AG, Wolfsburg (DE)

(72) Inventors: Christian Jördens, Braunschweig (DE); David Perdomo Lopez, Braunschweig (DE); Sven Chlosta, Sassenburg (DE)

(73) Assignee: Volkswagen AG (DE)

( * ) Notice: Subject to any disclaimer, the term of this patent is extended or adjusted under 35 U.S.C. 154(b) by 536 days.

(21) Appl. No.: 15/418,238

(22) Filed: Jan. 27, 2017

(65) Prior Publication Data
US 2017/0219714 A1    Aug. 3, 2017

(30) Foreign Application Priority Data
Feb. 3, 2016    (DE) .......................... 10 2016 201 667

(51) Int. Cl.
| | |
|---|---|
| *G01S 19/00* | (2010.01) |
| *G01S 19/24* | (2010.01) |
| *G08G 1/01* | (2006.01) |
| *G01C 21/26* | (2006.01) |
| *G01C 21/36* | (2006.01) |
| *G01C 21/34* | (2006.01) |
| *G08G 1/0967* | (2006.01) |

(52) U.S. Cl.
CPC .............. *G01S 19/24* (2013.01); *G01C 21/26* (2013.01); *G01C 21/3407* (2013.01); *G01C 21/3602* (2013.01); *G08G 1/0112* (2013.01); *G08G 1/096791* (2013.01)

(58) Field of Classification Search
USPC .......................................................... 701/412
See application file for complete search history.

(56) References Cited

U.S. PATENT DOCUMENTS

| | | | | |
|---|---|---|---|---|
| 2010/0256835 | A1* | 10/2010 | Mudalige | G08G 1/163 701/2 |
| 2015/0039350 | A1* | 2/2015 | Martin | G06Q 30/0261 705/4 |
| 2017/0300764 | A1* | 10/2017 | Kakegawa | G06T 1/00 |

FOREIGN PATENT DOCUMENTS

| | | |
|---|---|---|
| DE | 102010013647 A1 | 2/2011 |
| DE | 102009046676 A1 | 5/2011 |
| DE | 102009047264 A1 | 6/2011 |

(Continued)

OTHER PUBLICATIONS

Search Report from German Patent Application No. 10 2016 201 667.9; dated Nov. 11, 2016.

*Primary Examiner* — James M McPherson
(74) *Attorney, Agent, or Firm* — Barnes & Thornburg LLP

(57) ABSTRACT

A method for determining a desired trajectory for a first road user for a route section. A process involves at least one trajectory that the at least one second road user has used to cover the route section being ascertained by one or more sensors. Then, a further process involves a piece of information about the at least one trajectory covered being transmitted to a computation unit. A process involves a desired trajectory for the first road user for covering the route section being ascertained, based on the at least one piece of information about the trajectory covered by the at least one second road user with the computation unit.

10 Claims, 5 Drawing Sheets

(56) References Cited

FOREIGN PATENT DOCUMENTS

| | | |
|---|---|---|
| DE | 102013015348 A1 | 4/2014 |
| DE | 102014200638 A1 | 7/2015 |

* cited by examiner

METHOD FOR DETERMINING A DESIRED TRAJECTORY FOR A FIRST TRAFFIC USER, IN PARTICULAR FOR A MOTOR VEHICLE, FOR A ROUTE SECTION

PRIORITY CLAIM

This patent application claims priority to German Patent Application No. 10 2016 201 667.9, filed 3 Feb. 2016, the disclosure of which is incorporated herein by reference in its entirety.

SUMMARY

Illustrative embodiments relate to a method for determining a desired trajectory for a first road user, particularly for a motor vehicle, for a route section.

BRIEF DESCRIPTION OF THE DRAWINGS

Further configurations are described in more detail below on the basis of the exemplary embodiments depicted in the drawings, which exemplary embodiments generally do not constitute an overall restriction for exemplary embodiments, however. In the drawings.

DETAILED DESCRIPTION

Figure 1:
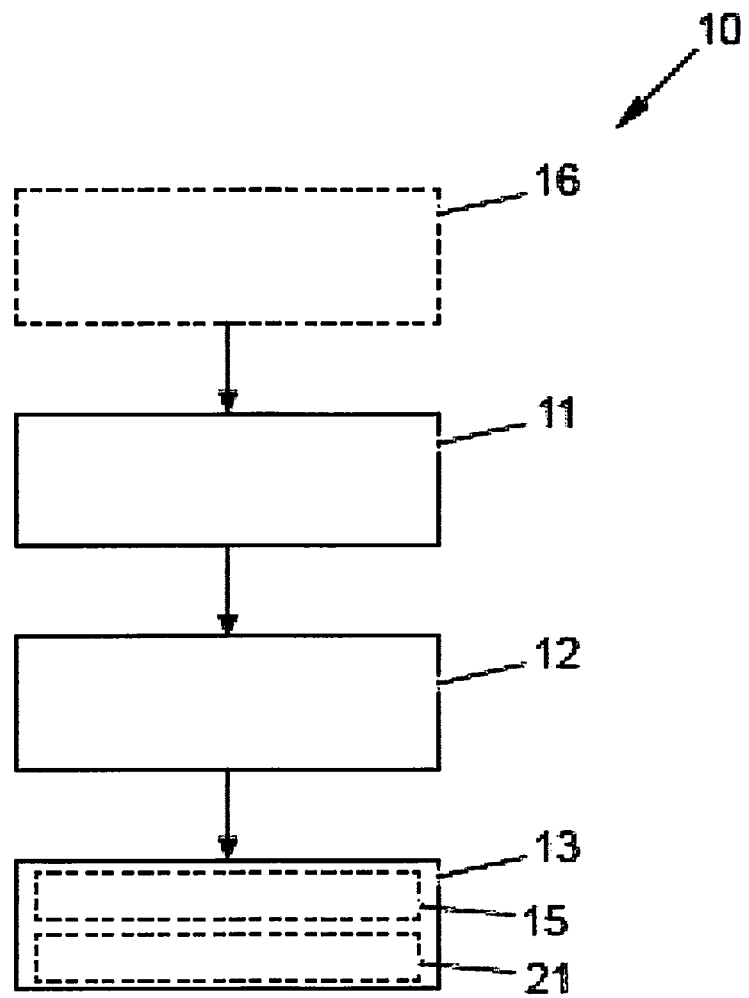
FIG. 1 illustrates a schematic depiction of a method for determining a desired trajectory for a first road user, particularly for a motor vehicle, for a route section according to an exemplary embodiment.

To assist a road user, i.e., a driver of a vehicle, various conventional assistance systems are used. These conventional assistance systems may be a parking assistance system, as disclosed in DE 10 2013 015 348 A1, for example. To facilitate parking, data from earlier journeys by a vehicle, which can also be referred to as the ego vehicle, are inferred at the same location.

These systems generally provide no or at least insufficient assistance for route sections that are unknown to the road user. Such route sections may be junctions, for example, DE 10 2009 046 676 A1 and DE 10 2009 047 264 A1 relate to driving assistance systems that provide assistance for a turning maneuver. To this end, a trajectory traveled is compared with a desired trajectory. The driver can then be provided with a piece of information or an instruction for steering, or a steering intervention is performed. This may be useful, for example, when it is difficult to keep to the correct lane when turning at a junction that is unknown to the driver. This may be the case at large junctions when there are multiple lanes available for turning, for example. At such junctions, but also in the case of many other route sections, such as turning lanes, roundabouts or the like, it may be difficult or effortful to ascertain a desired trajectory that can be used to cover the route section in a best way.

There is therefore a need to improve a concept that assists a road user in covering a route section. This need is accommodated by the method of the independent claim.

Disclosed embodiments relate to a method for determining a desired trajectory for a first road user, i.e., for a motor vehicle, for a route section. To this end, at least one trajectory that at least one second road user has used to cover the route section is ascertained. This can be accomplished by using one or more sensors. Further, a piece of information about the at least one trajectory covered is sent to a computation unit. The desired trajectory for the first road user for covering the route section is then ascertained. This is effected by means of the computation unit, based on the at least one piece of information about the trajectory covered by the at least one second road user. In some exemplary embodiments, the fact that the desired trajectory is determined on the basis of at least one course of at least one other road user allows the desired trajectory to be improved in terms of accuracy and/or up-to-dateness. This can be achieved, by way of example, by virtue of the desired trajectory being updated at regular distances. In other words, in some exemplary embodiments, a continuous check can be achieved by a desired/actual comparison and adjustment of the desired trajectory, for example, if multiple road users, i.e., drivers, override a steering recommendation resulting from the desired trajectory. This can indicate structural changes in the route section, for example. This means that the desired trajectory can have a high level of up-to-dateness, since, by way of example, roadworks are known after a short time or can be taken into consideration in the ascertained desired trajectory as a result of the continuous check.

The route section may be all possible route sections that can be covered by a road user. The route section may have multiple lanes, for example, that is to say have a plurality of lanes in the same direction and/or comprise a turning lane, a curve or the like. By way of example, it may be a junction, a roundabout, a turning lane, each of which has one or more lanes, or the like. In exemplary embodiments in which the route section comprises or is a multilane junction, keeping to a lane can be simplified for a road user.

The desired trajectory or a piece of information about the desired trajectory may be, by way of example, any piece of information or instruction that is suitable for describing a course or a path of movement on which the route section is intended to be crossed. To this end, the desired trajectory can be produced, by way of example, from odometry data and/or inertial platforms and/or further locating methods, such as GPS, WLAN or the like, for example. The odometry data may be, by way of example, a piece of information about a steering angle and/or rotation speeds or wheel ticks of at least one wheel or of a plurality of wheels. In some exemplary embodiments, the odometry data are possibly used only for producing the trajectory. The trajectory then possibly contains have no odometry data or steering angles. The desired trajectory can additionally or alternatively also comprise at least one or a plurality of polygon trains, polynomials, clothoid segments and/or curvature trends. The desired trajectory can comprise, by way of example, a driving instruction, an instruction for transverse control, for example, permitted positional deviation tolerances or trigger points for turn indicator signals, and/or an instruction for longitudinal control, that is to say a speed profile, for example. The desired trajectory can also be used for a graphical depiction of the desired trajectory such as a curvature, length, a trend or the like. The desired trajectory can also comprise, by way of example, a piece of information about its position in the route section. The position may be, by way of example, a position or orientation of the desired trajectory in the route section. Alternatively, this piece of information can also be obtained by determining a starting point for the desired trajectory. In some exemplary embodiments, the desired trajectory is output to the first road user. By way of example, the desired trajectory can be output visually, audibly, haptically and/or as an actuating signal for a steering and/or a drive train.

The trajectory or the trajectory covered or a piece of information about the trajectory may be, by way of example, a course or a path of movement that at least one second road user has used to cross or cover the route section. The trajectory can be ascertained from odometry data e, for example. By way of example, the trajectory can be ascertained from one or more steering angles and/or rotation speeds or wheel ticks of at least one wheel or of multiple wheels. The trajectory can additionally or alternatively also comprise at least one or a plurality of polygon trains, polynomials, clothoid segments and/or curvature trends. The trajectory can also comprise, by way of example, a piece of information about a position in the route section. Alternatively, this piece of information can also be obtained by determining a starting point for the trajectory.

A first road user may be, by way of example, any vehicle, a motor vehicle, an automobile, a truck, a bus, a motorcycle, a scooter or else a pedestrian carrying a mobile telephone with him, or the like. The second road user may also be one of the cited examples. However, the second road user differs from the first road user in that it has covered or crossed the route section before the first road user. In exemplary embodiments in which the road user is a vehicle, the property as a first road user may be independent of a driver. In other words, the same vehicle, regardless of a change of driver, can always be considered to be the first road user, for example.

A computation unit may be any device that is designed to process at least one of the cited signals. By way of example, the computation unit may be a processor, a digital signal processor, a central processing unit (CPU), a multipurpose processor (MPP) or the like.

In some exemplary embodiments, the desired trajectory is ascertained based on the trajectory covered by exactly one second road user ahead of the first road user. The desired trajectory can then correspond to the trajectory of the second road user. In some exemplary embodiments, the effect that can be achieved by this is that the first road user crosses the route section in the same way as the second road user ahead of it. The piece of information about the trajectory can then be transmitted directly from the second road user to the first road user, for example. This can be accomplished by using all possible telecommunication devices, wireless transmission methods, radio links, but also methods that, by way of example, are based on an optical and/or acoustic transmission, for example, even Car2Car or the like. Alternatively, it is also possible to use indirect transmission methods, such as by means of a remote computer center, a remote memory unit, which can also be referred to as a cloud, or a superordinate control unit, for example. The second road user may be directly ahead of the first road user, for example, so that there is no further road user between the first and second road users in a direction of movement of the first road user. Alternatively, the second road user may also be indirectly ahead of the first road user, so that there is at least one further road user between the first and second road users in a direction of movement of the two.

Alternatively, it is also possible to use a plurality of trajectories that have been used to cover the route section to ascertain the desired trajectory. In some exemplary embodiments, as the desired trajectory is ascertained based on a plurality of trajectories already covered, it is possible to reduce an effect of an extreme trajectory. An extreme trajectory can run close to a roadway edge and/or have many steering movements, for example. Any trajectory may be at least one course that at least one second and a third road user and/or further road users have used to cross the route section. It may be possible for there also to be a plurality of trajectories for the second, third and/or further road users that the road user has used to cross the route section. The desired trajectory can, in some exemplary embodiments, be ascertained from a plurality of trajectories covered by forming a mean value and/or a median. Naturally, it is possible, for example, in the case of multilane route sections, to ascertain a desired trajectory for a lane only from the trajectories for the relevant lane. A lane may have its width, for example, bounded by a marking, for example, a shoulder and/or median strip or another lane marking.

The sensor(s) for ascertaining the trajectory covered may be, by way of example, any sensor that is designed to ascertain or capture position data for the at least one second road user. The sensor(s) may be designed, by way of example, to capture position data from the second road user with a sufficient accuracy, for example, to an accuracy of at least 10 cm, 5 cm or 1 cm. The sensor(s) can, to this end, have a sampling rate or resolution, for example, that suffices to achieve the accuracy, for example, at least at a distance of at least 100 ms, 10 ms, 1 ms or the like. The sensor(s) may be associated with the second road user and/or carried by the latter, for example. The sensor may be, by way of example, a camera, a GPS sensor or the like or the sensor can comprise one of these components. Additionally or alternatively, the sensor(s) may also be a sensor that is designed to ascertain or capture odometry data from the second road user. The odometry data from the second road user may be, by way of example, a steering angle, a speed, for example, rotation speeds and/or wheel ticks of one or more wheels and/or the like. In some exemplary embodiments, as the desired trajectory is based on a trajectory being traced back from odometry data and a steering angle, it is possible to achieve independence of the type of road user, i.e., a vehicle type. It is sometimes possible for data from different road users or vehicle types, for example, even from an automobile, to be transmitted to a truck. Alternatively, the sensor can also comprise or be a camera that monitors or records the route section. This camera may be associated with the route section, for example. The camera monitoring the route section is then not moved by the second or another road user or is not mounted thereon, for example.

Additionally or alternatively, the piece of information about the trajectory captured using the sensor(s) can be transmitted directly to the computation unit, for example. By way of example, the sensor(s) and the computation unit may be coupled by means of wireless signal transmission methods, for example, radio, W-LAN, mobile radio, Car2X or the like. Alternatively, the piece of information about the trajectory captured using the sensor(s) can, by way of example, also be transmitted to the computation unit indirectly, for example, via a cloud. The cloud and the computation unit and/or even the sensor(s) can communicate with one another by means of the aforementioned signal transmission method, for example.

In some exemplary embodiments, a piece of information about an origin of the second road user is ascertained. This piece of information is then compared with a comparison range associated with the route section. If the origin of the second road user is within the comparison range, the trajectory covered by the second road user is rated or weighted higher for ascertaining the desired trajectory than a trajectory of a road user whose origin is outside the comparison range. This can result in the trajectory being included in the ascertainment of the desired trajectory repeatedly, for example. By way of example, this can be accomplished by each trajectory having an associated weighting factor. The weighting factor can be multiplied by a factor of greater than 1, for example, if the origin of the road user is within the comparison range. Additionally or alternatively, in some exemplary embodiments, it is also possible for road users that produce a number of trajectories for the route section that exceeds a limit value to be classified as knowing the location. It may then be possible for the trajectories thereof to be used repeatedly for ascertaining the desired trajectory, and/or for the weighting factor thereof to be multiplied by a factor of greater than 1, for example, to obtain a higher weighting than other trajectories. In some exemplary embodiments, the effect that can be achieved by the cited measures is that the trajectories of different road users can be weighted with different strengths. The piece of information about the origin may be, by way of example, a place of residence, an identification number (ID), a vehicle registration center, a number plate or the like for the road user. The comparison range can have, by way of example, a region, a piece of information, comparison values, a distance or the like that identify or at least classify the road user as one knowing the location. If the road user is identified or classified as one knowing the location, then the trajectory covered by the road user can be weighted higher for forming the desired trajectory than trajectories from road users not classified as knowing the location. The origin can be ascertained by reading a value from a memory, a manual input, a check or the like, for example.

Additionally or alternatively, in some exemplary embodiments, a starting position for the first road user is ascertained. In some exemplary embodiments, it may thus become possible for the first road user to be able to pass through the route section along the ascertained desired trajectory from its starting position or for the ascertained desired trajectory to be able to be implemented with sufficient accuracy. By way of example, the starting position can comprise a piece of information about a height along the direction of movement of the road user, a height perpendicular to the direction of movement, a distance from a shoulder or median strip and/or another lane marking, a kerb, from a stop line, a position in a lane, whether an outer or an inner lane is involved, a position in relation to other landmarks and/or the like. Additionally or alternatively, the starting position can comprise an orientation of the road user in relation to a shoulder, a median strip, a kerb, in the lane, a stop line, other landmarks and/or the like. Additionally or alternatively, the starting position can also comprise a piece of information about a steering angle and/or an orientation of the vehicle, which can also be referred to as a heading.

Additionally or alternatively, in some exemplary embodiments, a starting position for the trajectory of the second road user is ascertained. In some exemplary embodiments, the desired trajectory can then be better fine-tuned.

In some exemplary embodiments, the starting position is ascertained by means of at least one sensor. This can be accomplished by using, by way of example, all possible sensors that can capture a piece of information about the surroundings. By way of example, the sensor(s) can capture the starting position to an accuracy of at least 10 cm, 5 cm or 1 cm. This may be a sensor that is associated with the road user and/or is mounted thereon, for example, a camera. It is possible to use a camera that is arranged in or on an exterior mirror of the road user (top view camera), a front camera, an ultrasonic sensor, a GPS sensor of the road user and/or the like. Optionally, it is also possible to use a sensor that is associated with the route section and is not moved by the road user and/or is not mounted thereon.

Additionally or alternatively, in some exemplary embodiments, a beginning of a route section for which a desired trajectory is intended to be ascertained is detected. This can be effected by monitoring a driving behavior by means of a sensor, for example. By way of example, an active turn indicator, braking, acceleration, a reverse gear and/or a steering angle can indicate that a route section for which a desired trajectory or a trajectory is intended to be ascertained is beginning. In some exemplary embodiments, for example, for safety reasons, the piece of information from the driving behavior can also be linked to a piece of information about the position of the road user, map data, data from a superordinate control unit, data from other vehicles and/or the like.

In some exemplary embodiments, the ascertained desired trajectory can be compared with a comparison range that represents at least one trajectory permissible for the route section. In some exemplary embodiments, this can allow the desired trajectory to be compatible with traffic regulations. The comparison range can comprise trajectories permissible with respect to a geometry of the route section and/or traffic regulations, for example, or limit values for the trajectories. In some exemplary embodiments, the desired trajectory is output to the road user only if the desired trajectory is within the comparison range.

In some exemplary embodiments, a trajectory that the first road user uses to cover the route section can be ascertained by means of one or more sensors after the road user has been provided with an output of the desired trajectory. The trajectory covered by the first road user is then compared with the desired trajectory. If the desired trajectory and the trajectory of the first road user differ from one another by more than a limit value, a correction value can output, for example. In some exemplary embodiments, it is thus possible to allow the road user to keep to the desired trajectory in a simple manner. The correction value can be output visually, audibly, haptically and/or as an actuating signal for a steering and/or a drive train, for example.

The first and/or second road user may be, by way of example, a motor vehicle, for example, an automobile. In some exemplary embodiments, since these road users frequently use multilane junctions or turning lanes, it is possible to achieve considerable facility for a driver to keep to a lane.

Exemplary embodiments also relate to a system for determining a desired trajectory for a first road user, i.e., for a motor vehicle, for a route section. The system is designed to ascertain at least one trajectory that at least one second road user has used to cover the route section, by means of one or more sensors. The system comprises a computation unit that is designed to ascertain a desired trajectory for the first road user for covering the route section, based on the at least one piece of information about the trajectory covered by the at least one second road user.

In the description of the appended depictions that follows, like reference symbols denote like or comparable components. Further, combinatory reference symbols are used for components and objects that occur repeatedly in an exemplary embodiment or in a depiction, but are described collectively with respect to one or more features. Components or objects that are described using like or combinatory reference symbols may be embodied in like but possibly also different states with respect to individual, multiple or all features, for example, their dimensioning, unless the description explicitly or implicitly reveals otherwise.

FIG. 1 shows a schematic depiction of a method 10 for determining a desired trajectory for a first road user, i.e., for a motor vehicle, for a route section. To this end, a process 11 involves at least one trajectory that the at least one second road user has used to cover the route section being ascertained. This can be accomplished by using one or more sensors. Further, a further process 12 involves a piece of information about the at least one trajectory covered being sent to a computation unit. Then, a subsequent process 13 involves a desired trajectory for the first road user for covering the route section being ascertained. This is effected by means of the computation unit, based on the at least one piece of information about the trajectory covered by the at least one second road user.

The text below describes various exemplary embodiments of the method 10, the road user being a vehicle and the route section being a junction. Naturally, other exemplary embodiments, not depicted, may be other road users and/or route sections.

Figure 2:
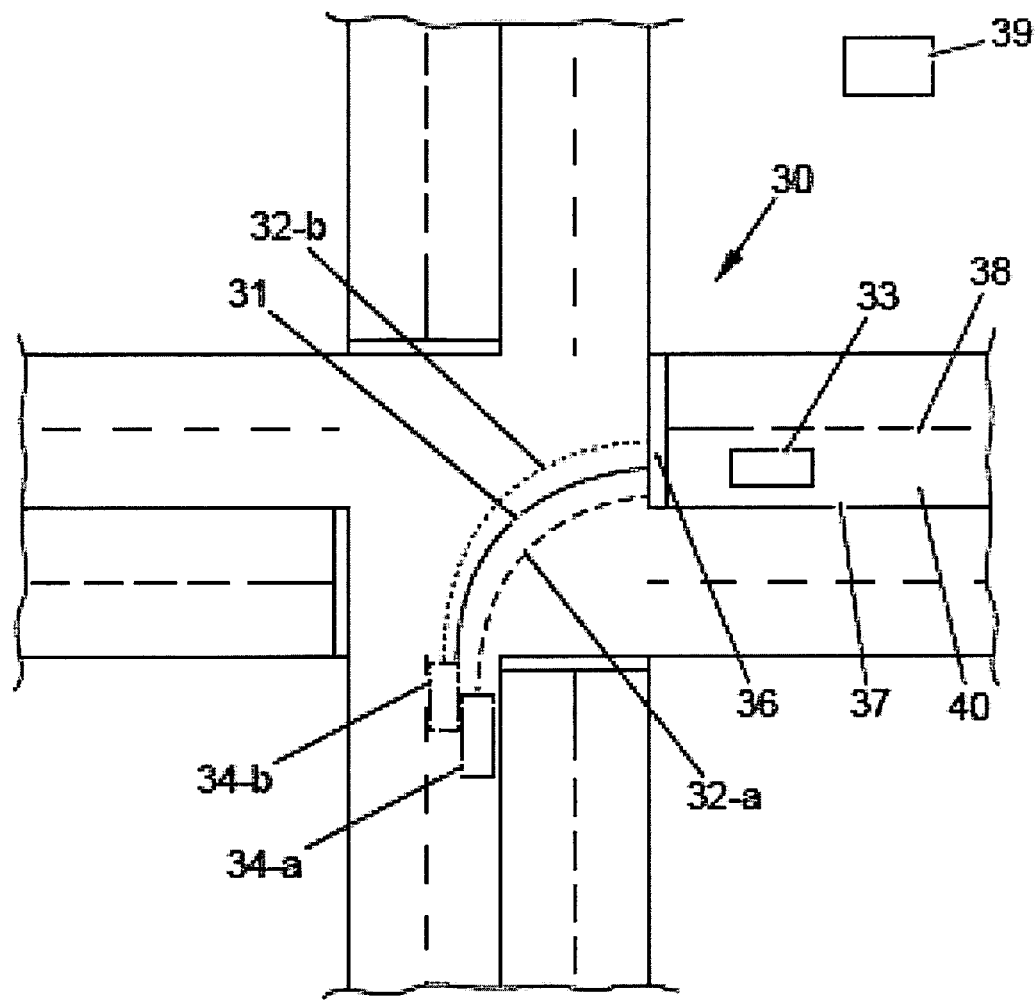
FIG. 2 shows a schematic depiction of a junction for which a desired trajectory is ascertained according to an exemplary embodiment.

FIG. 2 shows a schematic depiction of a junction 30 as a route section, for which junction a desired trajectory 31 for a first vehicle 33 is ascertained according to an exemplary embodiment. The junction 30 is a two-lane junction. The desired trajectory 31 is ascertained from a multiplicity of trajectories traveled or covered at this junction 31, only the two trajectories 32-*a* and 32-*b* of which are depicted in FIG. 2 by way of representation. The trajectories 32-*a* and 32-*b* traveled have been traveled by other or second vehicles 34-*a* and 34-*b*, which are depicted in dashed form.

In some exemplary embodiments, it is possible to use or take into consideration trajectories of all vehicles that have a suitable transmission/reception device, for example, an E-call interface, Car2X interface, Car2Car interface or the like, to make their trajectory covered available or a piece of information about the trajectory, for example, in the process 12.

Figure 2A:
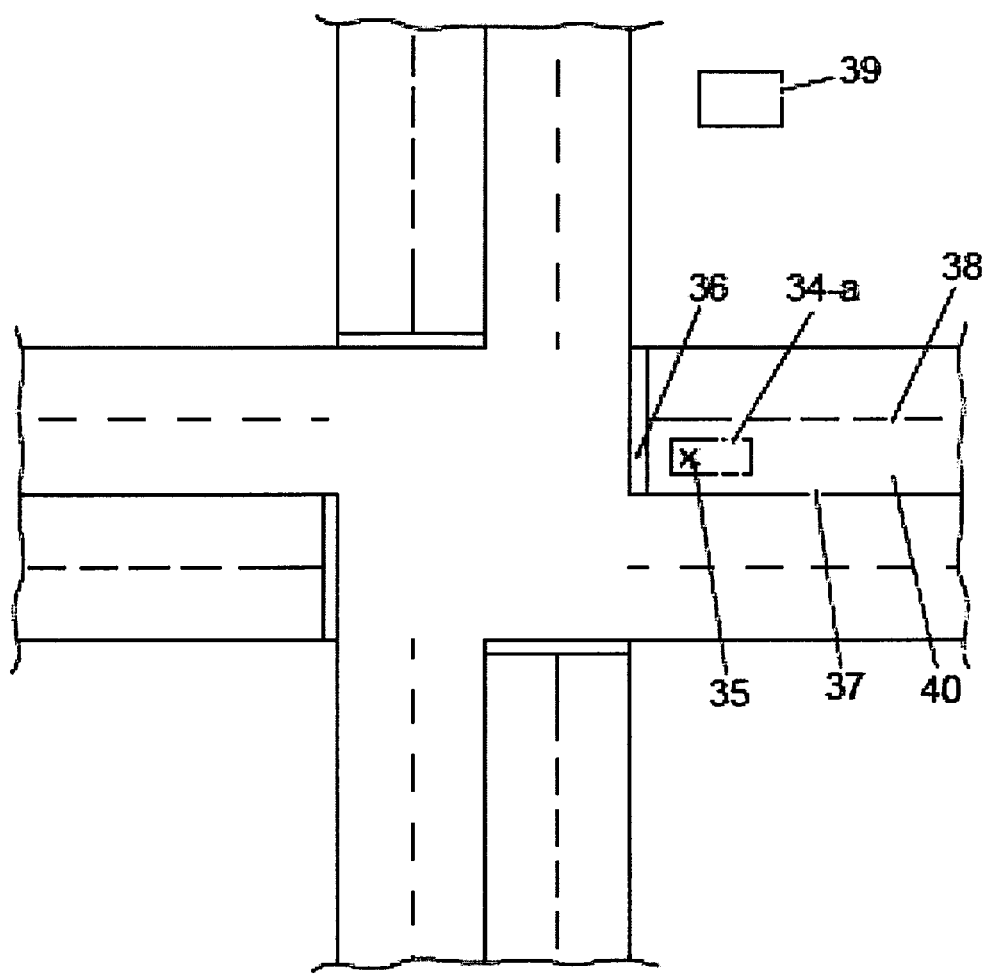
FIG. 2a shows a schematic depiction of the junction from FIG. 2 at another time.

Visual location is used at the beginning of a turning maneuver, as depicted for the second vehicle 34-*a* in FIG. 2*a*, to ascertain an exact starting position 35 for the turning maneuver. This can be accomplished, by way of example, by determining a position of at least one landmark with respect to the vehicle. To ascertain the starting position 35, a camera system can be used. In the exemplary embodiment of FIG. 2*a*, a camera system producing a plan view (for example: top view) is used to determine the distance from a stop line 36 and from lateral lane markings 37, 38. These or other landmarks may also be used to ascertain an orientation, what is known as a heading, of the vehicle 34-*a*. Analogously, it is also possible to ascertain an end position or end point of the trajectory. In some exemplary embodiments, ascertainment of the end position can also be dispensed with.

Beginning from the starting position 35, the trajectory traveled 32-*a* is determined from odometry data, for example, wheel ticks, wheel speeds, steering angles, of the vehicle 34-*a* in the process 11 and is transmitted to a computation unit 39, for example, as process 12. The computation unit 39 can be referred to as a server backend, for example. In other words, the computation unit may be part of a server with which the first and second vehicles communicate, which part is associated with the system. This can be repeated, for example, in the process 13, for a multiplicity of vehicles and journeys or trajectories, which are not depicted. In this way, at least the turning trajectories 32-*a* and 32-*b* are collected from a multiplicity of vehicles driving at the junction 30. These turning trajectories are statistically evaluated to determine a desired trajectory, for example, the desired trajectory 31. The desired trajectory 31 may be a spatial mean value for all ascertained or measured trajectories 32-*a* and 32-*b*, or a median. In some exemplary embodiments, the formation of a median can lessen an influence of extreme driving maneuvers.

The desired trajectory 31 determined in this manner is then used as a guideline for all further vehicles or the first vehicle 33 that wish(es) to perform a turning maneuver or the same turning maneuver, that is to say turning left in an inner lane 40, at the junction 30. Naturally, the method described 10 can also be applied to all other journeys through the junction 30, for example, driving straight on, turning right, turning left, in each case from an inner and an outer lane and in all directions.

The desired trajectory 31 can be output in a process 14. In this case, a driver of the first vehicle 33 can be assisted both by a piece of display information and by a steering intervention. In some exemplary embodiments, assistance or great benefit can be provided for a driver who is passing through the large junction 30 for the first time and, in this context, is provided with the assistance in the surroundings that are unknown to him.

In other words, the process 11 of the method 10 involves a multiplicity of turning trajectories 32-*a*, 32-*b* being collected. These are linked to a starting position 35, which can also be referred to as the starting point, and/or an end position, not depicted, which can also be referred to as the end point, for the specific junction 30. The end position can in this case describe an end of the trajectory in the direction of travel and the position thereof with respect to the landmarks 36, 38, 39 already described for the starting position, or others, for example. In the process 13, the multiplicity of trajectories traveled 32-*a*, 32-*b* are then statistically evaluated to determine the desired trajectories 31 by means of suitable statistical averaging methods, for example, by means of formation of a median.

In some exemplary embodiments, the method 10 can perform different weighting for individual trajectories when the desired trajectory 31 is ascertained in the process 13. There is the option of weighting the trajectories of a driver who knows the location higher than trajectories of drivers who do not know the location. This can be accomplished by ascertaining an origin of the driver or of the vehicle 34-*a* in a process 15 for example. It is then possible for the origin to be compared with the position of the junction in a process 21. Based on the comparison, the trajectory is then weighted to ascertain the desired trajectory. An origin, or the fact that a driver knows the location, may also be identifiable or given, for example, when a vehicle passes through the junction repeatedly with the same or a very similar trajectory. For this purpose, an identification number (ID) of the vehicle can be transmitted with the trajectory, for example. If the same or a similar trajectory is transmitted or ascertained for this identification number repeatedly or in a manner exceeding a stipulated limit value, then the vehicle can be classified as knowing the location. Accordingly, the trajectory can then be weighted higher when the desired trajectory 31 is ascertained.

Figure 3:
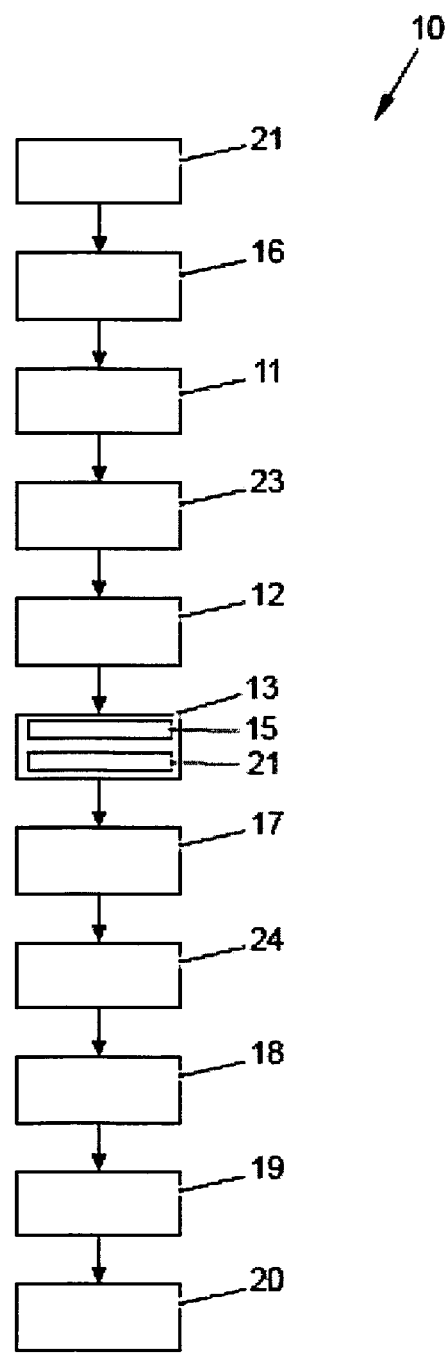
FIG. 3 shows a schematic depiction of a method for determining a desired trajectory for a vehicle for the junction from FIGS. 2 and 2a according to an exemplary embodiment.

FIG. 3 shows a schematic depiction of the method 10 for determining the desired trajectory 31 for the first vehicle 33 for the junction 30 of FIGS. 2 and 2*a* according to a further exemplary embodiment. For this purpose, a first process 22 involves checking whether a turning maneuver is planned. Events that indicate a turning maneuver or a planned turning maneuver may be an active turn indicator and a piece of information about the first vehicle 34-*a* being at a two-lane junction 30, for example. The piece of information about the position at a two-lane junction 30 can be ascertained by a GPS sensor, for example, possibly in combination with map data from a navigation appliance. Additionally or alternatively, the piece of information about the turning maneuver and/or the two-lane junction 30 can also be received from the vehicle 34-*a* via a radio interface, for example, via what is known as an E-call (emergency call) interface. An exemplary embodiment is a communication interface from the vehicle 34-*a* to a superordinate control unit, for example, a backend server or an infrastructure, for example, by means of Car2X.

Subsequently, the process 16 already described for FIG. 1 involves the starting position 35 of the second vehicle 34-*a* being ascertained. To this end, the starting position 35 comprises a piece of information about a positional deviation in the lane 40, that is to say the piece of information regarding the lane that the vehicle 34-*a* is in, a distance from the lane markings 37, 38 and the stop line 36 and a piece of information about an orientation of the vehicle 34-*a*, which can also be referred to as the vehicle heading. For the vehicle heading, it may be possible to use at least one further landmark position, for example, the position of a set of traffic lights or the like. These data can be captured, by way of example, using a vehicle-internal camera, for example, a camera that is arranged in the exterior mirrors (top view camera).

The process 11 then involves the odometry data being transmitted to the computation unit 39 and the resultant trajectory 32-*a* being computed. Alternatively, in some exemplary embodiments, it is also possible for orientation to landmarks to take place in a computation unit of the vehicle 34-*a* during the turning maneuver, for example, for the purpose of computing the trajectory 32-*a*.

A process 23 then involves an end position of the turning maneuver or of the turning trajectory 32-*a* being ascertained. This can be effected on the basis of similar events to the starting position, deactivation of the turn indicator, steering angles or likewise on the basis of map data that are read from a memory, for example, possibly in conjunction with a GPS system or by virtue of information from an infrastructure associated with the junction 30, for example, via Car2X.

In some exemplary embodiments, the trajectory 32-*a* is ascertained by recording a series of images throughout the turning maneuver. This can be accomplished by using a camera, for example, a camera in the exterior mirrors of the vehicle 34-*a*, but also an external camera. By way of example, the series of images can be used to perform a single check on a turning maneuver for the desired trajectory 31 in compliance with road traffic regulations at a later time. It may additionally be possible for front camera data from the vehicle 34-*a* to be transmitted. In some exemplary embodiments, it is possible for the camera data to be used to confirm turning in compliance with road traffic regulations remotely and hence for the trajectory 32-*a* to have a higher quality. In some exemplary embodiments, this check can be performed analogously for the desired trajectory.

Many such turning trajectories 32-*a*, 32-*b* are collected. A statistical evaluation is then performed (spatial median) to derive the desired trajectory 31 therefrom in the process 13 after a sufficiently large statistical basic set of individual trajectories 32-*a*, 32-*b* is available for the desired trajectory 31. The statistical evaluation means that the method 10 can be very robust.

It may now be possible for the desired trajectory 31 to be compared with a comparison range, which represents permissible trajectories, in a process 17. As a result, it is possible to achieve the effect, by way of example, that the desired trajectory 31 is permissible in terms of traffic regulations, as described above. In some exemplary embodiments, the process 17 can also be dispensed with.

In a subsequent process 24, the desired trajectory 31 is output. This can be accomplished by displaying the desired trajectory 31 or deriving a steering intervention on the basis of the desired trajectory 31. The process 24 or the output of the desired trajectory 31 can possibly be repeated for all further or at least multiple first vehicles 33 that pass through the junction 30. For the output of the desired trajectory 31 to the first vehicle 33, it is likewise possible for a starting position and/or an orientation or a heading to be taken into consideration at the beginning of the turning maneuver of the first vehicle 22. These values can be ascertained analogously to the starting position 35 for the second vehicle 34-*a*.

The desired trajectory 31 can be continually updated on every manual passage or on overriding during an already assisted journey. From this, it is possible to draw conclusions about changes that lead to a difference in the trajectory or in the driving behavior, for example.

A process 18 can involve a trajectory that the first vehicle 33 uses to cross the junction 30 being ascertained. This trajectory covered by the first vehicle 33, after the desired trajectory 31 has already been output, can be compared with the desired trajectory 31 in a process 19. If the desired trajectory 31 and the trajectory of the first vehicle 33 differ from one another by more than a limit value, then a correction value can be output in the process 20. The correction value may be an automatic steering intervention or a display. In some exemplary embodiments, the processes 18 to 20 can also be dispensed with.

Figure 4:
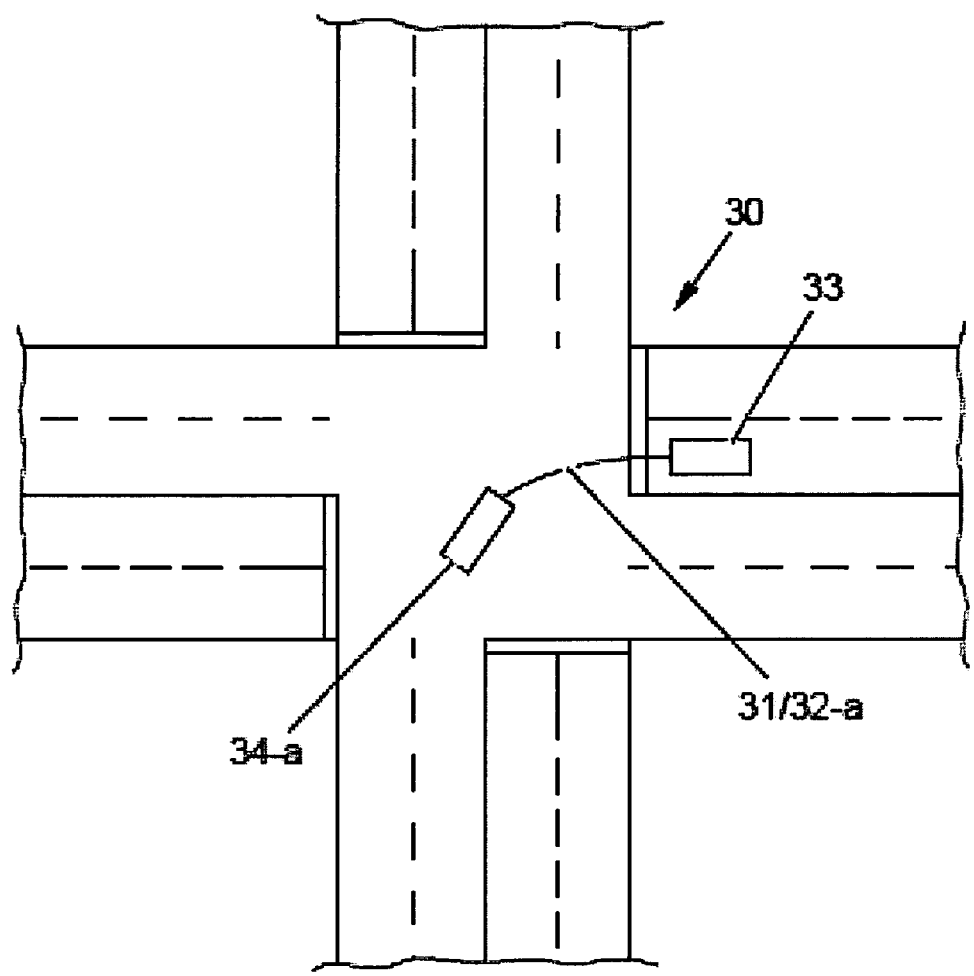
FIG. 4 shows a schematic depiction of the junction from FIGS. 2 and 2a for which a desired trajectory is ascertained according to a further exemplary embodiment.

FIG. 4 shows a schematic depiction of the junction 30, for which a desired trajectory 31, for the first vehicle 33, is ascertained according to a further exemplary embodiment.

The desired trajectory 31 is ascertained based on the trajectory covered 32-*a* by exactly one second vehicle 34-*a* ahead. The desired trajectory 31 corresponds to the trajectory 32-*a* of the second vehicle 34-*a* ahead. In other words, this means that the first vehicle 33 passes through the junction on the same course as the vehicle ahead 34-*a*. The desired trajectory 31 can naturally be adjusted to suit a starting position for the first vehicle 33 if the starting position of the first vehicle 33 differs from the starting position 35 of the second vehicle 34-*a*. The second vehicle 34-*a* ahead may be a vehicle that is directly or indirectly ahead. The information can be transmitted via Car2Car for example.

Alternatively, the transmission can also be effected via Car2Infrastructure (Car2I) or Car2X. By way of example, this entails the desired trajectory 31 being sent directly from the junction 30 or a computation unit 39 associated with the junction 30. In other exemplary embodiments, it is also possible to use all other possible wireless signal transmission methods, for example, radio, W-LAN, mobile radio or the like.

Some exemplary embodiments relate to trajectory-based turning at junctions and a method for ascertaining the desired trajectory. In comparison with conventional parking systems in which a trajectory traveled by the particular vehicle, for example, during parking, is taught to the system, some exemplary embodiments allow transferability to driving situations that are unknown to the first road user, for example, junctions, to be achieved. This is possible without the driver or the vehicle already having passed through the situation himself/itself. Hence, in some exemplary embodiments, great benefit arises for situations that are unknown, to the driver or the vehicle. The "drive like a local" concept means that not only is one's own trajectory traveled learnt, but rather, in some exemplary embodiments, the trajectory learnt by other vehicles at the same junction is adopted.

The exemplary embodiments disclosed in the description above, the claims below and the appended figures, and also the individual features of the exemplary embodiments, may be of importance, and can be implemented, both individually and in any combination for the realization of an exemplary embodiment in its various configurations. In some further exemplary embodiments, features that are disclosed as an apparatus feature in other exemplary embodiments may also be implemented as method features. Further, it may also be possible for features that are implemented as method features in some exemplary embodiments to be implemented as apparatus features in other exemplary embodiments.

LIST OF REFERENCE SYMBOLS

10 Method
11 Ascertainment of a trajectory
12 Sending to a computation unit
13 Ascertainment of a desired trajectory
14 Output of the desired trajectory
15 Ascertainment of a piece of information about an origin of the at least one second subscriber
16 Ascertainment of a starting position
17 Comparison of the desired trajectory with a permissible trajectory
18 Ascertainment of a trajectory covered by the first road user
19 Comparison with the desired trajectory
20 Output of a correction value
21 Comparison of the origin with a position of the road section
22 Check on whether turning maneuver is planned
23 Ascertainment of an end position
24 Output of the desired trajectory
30 Route section/junction
31 Desired trajectory
32 Trajectory
33 First vehicle
34 Second vehicle
35 Starting position
36 Stop line
37 Roadway marking
38 Roadway marking
39 Computation unit

The invention claimed is:

1. A method for determining a guideline trajectory for a first road user for a route section, the method being performed under control of a computation unit comprising a processor, and the method comprising:
   receiving, by the computation unit, and from one or more sensors, at least one second trajectory that at least one second road user has used to cover the route section, the at least one second trajectory ascertained by the one or more sensors;
   ascertaining, by the computation unit, information about the at least one second road user, the information including an origin position associated with the at least one second road user;
   assigning, by the computation unit, a weighting to the at least one second trajectory based on a comparison of the information about the at least one second road user and a position of the route section;
   ascertaining, by the computation unit, the guideline trajectory for the first road user for covering the route section, based on the weighting assigned to the at least one second trajectory covered by the at least one second road user;
   deriving, by the computation unit, a steering intervention based on the ascertained guideline trajectory; and
   outputting, by the computation unit, the steering intervention to the first road user.

2. The method of claim 1, wherein ascertaining the guideline trajectory is effected based on the at least one second trajectory covered by one of the at least one second road user ahead of the first road user, the guideline trajectory corresponding to the at least one second trajectory of the at least one second road user.

3. The method of claim 1, wherein the guideline trajectory is ascertained from a plurality of trajectories covered by forming a mean value and a median.

4. The method of claim 1, wherein at least one of the one or more sensors ascertains the at least one second trajectory covered to capture odometry data and wherein the sensor comprises a camera that monitors the route section.

5. The method of claim 1, further comprising:
   ascertaining, by the computation unit, information about an origin of the at least one second road user; and
   comparing, by the computation unit, the information with a comparison range associated with the route section, wherein the at least one second trajectory covered by the at least one second road user is weighted based on ascertaining the guideline trajectory in response to the origin of the at least one second road user being within the comparison range.

6. The method of claim 1, further comprising:
   receiving, by the computation unit, a starting position for the first road user and for the at least one second road user, the starting position determined by the one or more sensors.

7. The method of claim 6, wherein the one or more sensors comprises at least one camera, at least one sensor of the first road user that monitors surroundings and a GPS sensor.

8. The method of claim 1, further comprising:
   comparing the guideline trajectory with a comparison range that represents a trajectory for the route section that is compatible with a traffic regulation.

9. The method of claim 1, further comprising:
   receiving, by the computation unit and from the one or more sensors, an actual trajectory that the first road user uses to cover the route section;
   comparing the trajectory of the first road user with the guideline trajectory; and
   outputting a correction value in response to the guideline trajectory and the actual trajectory of the first road user differing from one another by more than a limit value.

10. The method of claim 1, wherein the first road user and the at least one second road user are motor vehicles.

* * * * *